(12) United States Patent
Eckert et al.

(10) Patent No.: US 11,881,712 B2
(45) Date of Patent: Jan. 23, 2024

(54) VOLTAGE DIP COMPENSATION SYSTEM AND ARRANGEMENT IN A POWER SUPPLY NETWORK

(71) Applicant: Fluence Energy, LLC, Arlington, VA (US)

(72) Inventors: Peter Eckert, Erlangen (DE); Oliver Reimann, Erlangen (DE)

(73) Assignee: Fluence Energy, LLC, Arlington, VA (US)

(*) Notice: Subject to any disclaimer, the term of this patent is extended or adjusted under 35 U.S.C. 154(b) by 39 days.

(21) Appl. No.: 16/628,121

(22) PCT Filed: Jun. 27, 2018

(86) PCT No.: PCT/EP2018/067210
§ 371 (c)(1),
(2) Date: Jan. 2, 2020

(87) PCT Pub. No.: WO2019/007769
PCT Pub. Date: Jan. 10, 2019

(65) Prior Publication Data
US 2020/0136390 A1    Apr. 30, 2020

(30) Foreign Application Priority Data
Jul. 4, 2017  (DE) .................. 10 2017 211 355.3

(51) Int. Cl.
*H02J 3/32* (2006.01)
*H02J 3/36* (2006.01)

(52) U.S. Cl.
CPC . *H02J 3/36* (2013.01); *H02J 3/32* (2013.01)

(58) Field of Classification Search
CPC .......... B60R 16/033; B60R 16/03; H02J 7/14; H02J 7/35; H02J 7/0049; H02J 2310/46; H02J 2310/40; H02J 7/00; Y02T 10/70
See application file for complete search history.

(56) References Cited

U.S. PATENT DOCUMENTS

| 7,459,803 B2* | 12/2008 | Mosman | H02J 3/005 307/64 |
| 2014/0167701 A1* | 6/2014 | Nakatsuka | H02J 3/32 320/134 |
| 2016/0254665 A1 | 9/2016 | Hur et al. | |

FOREIGN PATENT DOCUMENTS

| CN | 203278255 U | 11/2013 |
| DE | 102013019420 A1 | 6/2014 |
| WO | WO 2008017014 A2 | 2/2008 |

OTHER PUBLICATIONS

Pal, et al, State of the Art: Dynamic Voltage Restorer for Power Quality Improvement, Electrical & Computer Engineering: An International Journal (ECIJ) vol. 4, No. 2, (Year: 2015).*

(Continued)

*Primary Examiner* — Elim Ortiz
(74) *Attorney, Agent, or Firm* — RatnerPrestia

(57) ABSTRACT

An arrangement is for compensating voltage drops in a power supply network. The arrangement includes at least one first converter system and a second converter system. The intermediate circuits thereof are coupled, and the first converter system is connected to a first distribution and the second converter system is connected to a second distribution.

16 Claims, 4 Drawing Sheets

(56) References Cited

OTHER PUBLICATIONS

Wikipedia: "Bahnstrom"; Stand Mar. 30, 2017; https://de.wikipedia.org/w/index.php?title=Bahnstrom&oldid=164084792, abgerufen am May 30, 2018; 2017.

Daehler Peter et a: "Stabilere Fertigungsprozesse durch hohe Stromversorgungsqualität"; XP055513940, ABBTechnik, 2001, vol. 1, pp. 62-68, ISSN 0346-1637, URL: https://library.e.abb.com/public/2cf2fucbffia0a2e1c1256ddd00346d20/6 2-68%20M662%20-%20GER.pdf; gefunden am Oct. 10, 2018, mentioned in the application, p. 64; 2001.

Pal Rakeshwri et al: "State of the Art: Dynamic Voltage Restorer for Power Quality Improvement", Electrical & Computer Engineering: An International Journal, vol. 4, No. 2, pp. 79-98, XP055513941, DOI: 10.14810/ecij.2015.4208; 2015.

Pal Rakeshwri et al: "State of the art: Dynamic voltage restorer for power quality improvement"; in: Electrical & Computer Engineering: An International Journal (ECIJ), vol. 4, No. 2, pp. 79-98, ISSN 2201-5957; D01: 10.14810/ecij.2015.4208. URL: wireilla.com/engg/ecij/papers/4215ecij08.pdf; 2015.

PCT International Search Report and Written Opinion of International Searching Authority dated Dec. 19, 2018 corresponding to PCT International Application No. PCT/EP2018/067210 filed Jun. 27, 2018.

* cited by examiner

VOLTAGE DIP COMPENSATION SYSTEM AND ARRANGEMENT IN A POWER SUPPLY NETWORK

PRIORITY STATEMENT

This application is the national phase under 35 U.S.C. § 371 of PCT International Application No. PCT/EP2018/067210 which has an International filing date of Jun. 27, 2018, which designated the United States of America and which claims priority to German patent application no. DE 102017211355.3 filed Jul. 4, 2017, the entire contents of each of which are hereby incorporated herein by reference.

FIELD

Embodiments of the invention generally relate to an arrangement for compensating for voltage dips in a power supply network, and to a system comprising such an arrangement.

BACKGROUND

Voltage dips in network supply systems occur more or less regularly usually as a result of natural causes. Examples of these may be weather situations, a bird strike or other external influences. These events are generally short-lived, typically 50 ms to a few hundred ms, and can result in brief interruptions of typically up to 300 ms or longer interruptions of up to 3 minutes or longer.

The depth of the voltage dip can vary between 20% and 100%, wherein the voltage dip can occur in single-pole or multi-pole fashion. These albeit very brief dips in the voltage supply often result in disturbances in installations such as manufacturing or process equipment. By way of example, a robot controller or the like may fail, as a result of which in some instances considerable financial damage may arise.

Daehler, Eichler, Gaupp and Linhofer: ABB Technik 1/2001 have drawn attention to the need for a high power supply quality for stabler manufacturing processes. In this context they refer for example to large, fast uninterruptible power supplies (UPS), but the latter step in typically primarily in the event of a complete power failure. For short-lived disturbances that often occur only in one phase, they describe known voltage stabilizers such as a "dynamic voltage restorer (DVR)". These voltage stabilizers can compensate for temporary voltage dips without delay.

In order to compensate for network dips in the short term, it is likewise possible to use energy stores with network decoupling, so-called "line-interactive UPS", which can bridge even total failures of the network voltage that last for minutes.

Pal and Gupta: Electrical & Computer Engineering: An International Journal (ECIJ) Vol. 4, No. 2, June 2015, generally describe how voltage dips can be compensated for by way of known voltage stabilizers such as dynamic voltage restorers.

SUMMARY

The inventors have recognized that known dynamic voltage restorer voltage stabilizers are limited in terms of treatment of the type of fault, duration and in terms of power and can therefore control only a portion of all faults. The magnitude of this portion is dependent on the local conditions. By way of example, dynamic voltage restorer voltage stabilizers can compensate only for voltage dips up to approximately 40% residual voltage. An interruption of the voltage supply cannot be compensated for. Likewise, an active power cannot be transferred.

At least one embodiment of the invention provides an arrangement and a system which can compensate for voltage dips in the network reliably and in a short time.

At least one embodiment of the invention is directed to an arrangement for compensating for voltage dips in a power supply network. Advantageous configurations of the arrangement according to embodiments of the invention are specified in the claims. At least one embodiment of the invention is directed to a system. Advantageous configurations of the system according to embodiments of the invention are specified in the claims.

The arrangement for compensating for voltage dips in a power supply network of an embodiment comprises at least one first converter system and a second converter system, the link circuits of which are coupled, wherein the first converter system is connected to a first distribution and the second converter system is connected to a second distribution.

At least one embodiment of the invention is directed to a system, wherein the system comprises an arrangement according to at least one embodiment of the invention and a first network infeed and a second network infeed, wherein the first network infeed is connected to the first distribution via a first transformer and a first switch, and wherein the second network infeed is connected to the second distribution via a second transformer and a second switch.

At least one embodiment of the invention is directed to an arrangement for compensating for voltage dips in a power supply network, the arrangement comprising:
  at least one first converter system; and
  a second converter system, link circuits of the at least one first converter system and the second converter system being coupled, wherein the at least one first converter system is connected to a first distribution and the second converter system is connected to a second distribution.

At least one embodiment of the invention is directed to a system, comprising:
  an arrangement;
  a first network infeed; and
  a second network infeed, the first network infeed being connected to a first distribution via a first transformer and a first switch, and the second network infeed being connected to a second distribution via a second transformer and a second switch.

BRIEF DESCRIPTION OF THE DRAWINGS

The above-described properties, features and advantages of this invention and the way in which they are achieved will become clearer and more clearly understood in association with the following description of the example embodiments which are explained in greater detail in association with the figures, in which.

DETAILED DESCRIPTION OF THE EXAMPLE EMBODIMENTS

Figure 1:
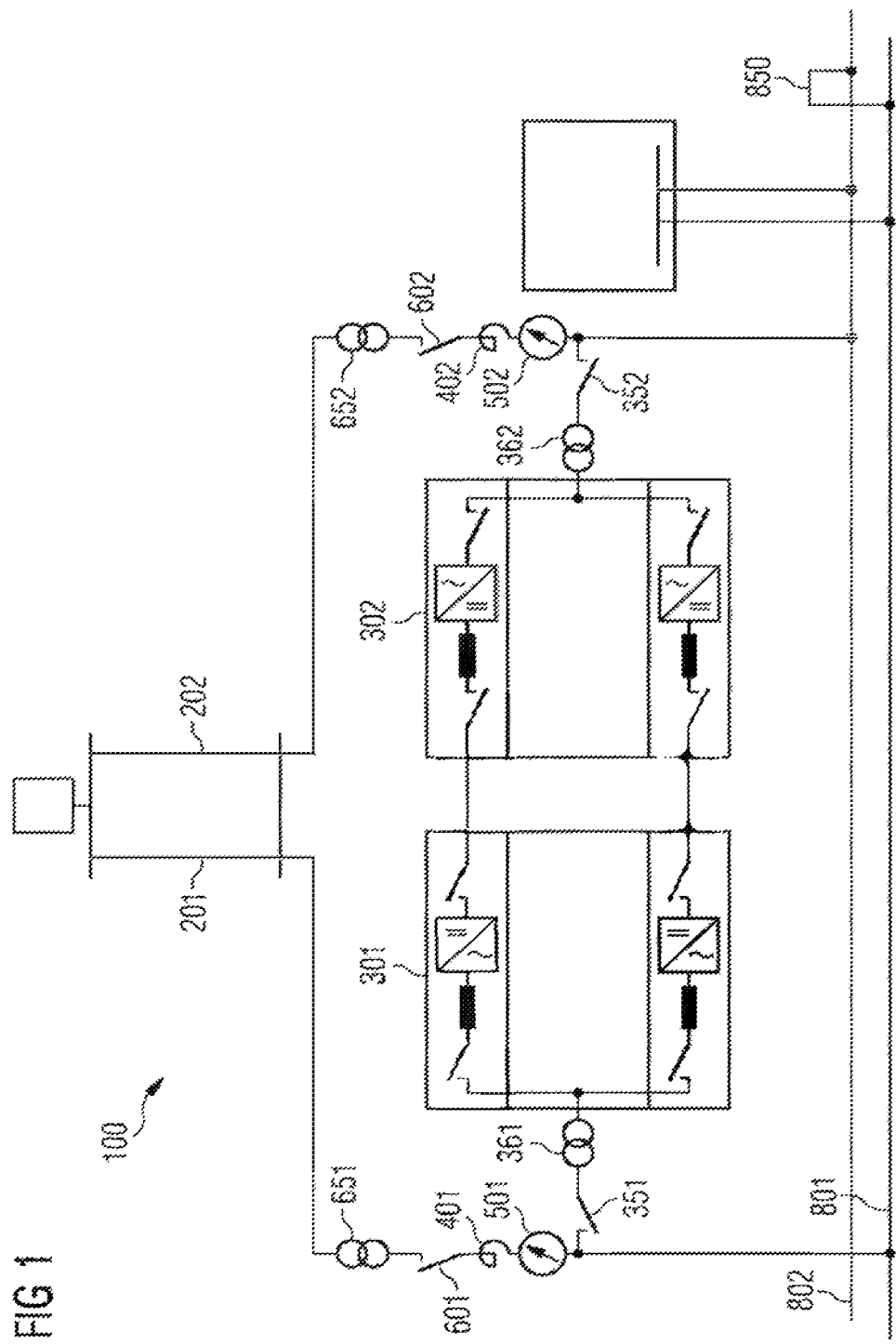
FIG. 1 shows a system comprising first and second converter systems and also first and second network infeeds.

At least one embodiment of the invention is directed to an arrangement for compensating for voltage dips in a power supply network. Advantageous configurations of the arrangement according to embodiments of the invention are specified in the claims. At least one embodiment of the invention is directed to a system. Advantageous configurations of the system according to embodiments of the invention are specified in the claims.

The arrangement for compensating for voltage dips in a power supply network of an embodiment comprises at least one first converter system and a second converter system, the link circuits of which are coupled, wherein the first converter system is connected to a first distribution and the second converter system is connected to a second distribution.

An advantageous aspect of at least one embodiment is that the functional principle of each individual converter system corresponds to that of the line-interactive UPS, which protects a sensitive load against disturbances in the network by virtue of the fact that it decouples the faulty network via an inductor and maintains the voltage at the critical load. Proceeding from the assumption that a fault occurs only on one of the two distributions, the power can be transferred from one feed system into the other feed system. In this case, there is no need for an additional energy store in the link circuit. In contrast to the likewise possible dynamic voltage restorer voltage stabilizers, which control only up to 80% of all fault cases, the arrangement according to the invention without an energy store can cover approximately 90% of all faults and the arrangement according to the invention with an energy store can cover 100% of all network faults.

In one embodiment, the first converter system is connected to the first distribution with a first decoupling inductor and a first voltage measurement and the second converter system is connected to the second distribution with a second decoupling inductor and a second voltage measurement.

In a further configuration of at least one embodiment, the first converter system and the second converter system are embodied in each case as a DC/AC converter system.

In one configuration of at least one embodiment, the coupling of the link circuits comprises battery systems. What is advantageous here is that it is thereby possible to compensate for all network faults and voltage dips in the main infeed with a duration of from 10 ms to a few minutes, the length of the compensation being dependent on the battery design or the installed battery capacities.

In a further configuration of at least one embodiment, the first distribution and the second distribution are embodied in each case as a medium-voltage distribution.

At least one embodiment of the invention is directed to a system, wherein the system comprises an arrangement according to at least one embodiment of the invention and a first network infeed and a second network infeed, wherein the first network infeed is connected to the first distribution via a first transformer and a first switch, and wherein the second network infeed is connected to the second distribution via a second transformer and a second switch.

In a further configuration of at least one embodiment, in a first state the first switch is closed and the second switch is open and in a second state the first switch is open and the second switch is closed, with the result that one of the two network infeeds is electrically connected to one of the distributions.

In an alternative embodiment, in the normal state the first switch and the second switch are closed and in a failure state either the first switch is opened or the second switch is opened, with the result that one of the two network infeeds is electrically connected to one of the distributions.

In one embodiment, the first distribution is electrically connected to the second distribution via a back-to-back link.

In a further configuration, before the switchover of a switch, measured values of the first voltage measurement and/or of the second voltage measurement are used for phase matching.

FIG. 1 illustrates an arrangement 100 for compensating for voltage dips in a power supply network. The arrangement 100 comprises a first converter system 301 and a second converter system 302, the link circuits of which are coupled. The first converter system 301 is connected to a first distribution 801 and the second converter system 302 is connected to a second distribution 802. The first distribution 801 and the second distribution 802 can be embodied in each case as a medium-voltage distribution.

The first converter system 301 is connected to the first distribution 801 together with a first decoupling inductor 401 and a first voltage measurement 501. The second converter system 302 is connected to the second distribution 802 together with a second decoupling inductor 402 and a second voltage measurement 502.

The first converter system 301 and the second converter system 302 can be embodied in each case as a DC/AC converter system. By way of example, these two converter systems 301, 302 can be based on the Siestorage S800 installation from Siemens AG.

FIG. 1 furthermore illustrates a first network infeed 201 and a second network infeed 202. The first network infeed 201 is connected to the first distribution 801 via a first transformer 651 and a first switch 601. Consequently, infeed is effected via the first network infeed 201 and the first transformer 651 and also via the first switch 601 to the first decoupling inductor 401 and the first voltage measurement 501 to the first distribution 801.

The first converter system 301 is arranged between the first voltage measurement 501 and the first distribution 801 via a first converter transformer 361 and a first converter switch 351. Via the first converter switch 351, the first converter 301 can be decoupled for maintenance purposes, for example. In the normal operating state, the first converter switch 351 is closed. The first converter transformer 361 and the first converter switch 351 serve as first linking of the first converter 301.

The coupling-in path via the second network infeed 202 is analogous to the coupling-in path of the first network infeed 201. This means that proceeding from the second network infeed 202 via the second transformer 652 and via the second switch 602, the second decoupling inductor 402 and the second voltage measurement 502 are connected to the second distribution 802. The second converter system 302 is connected between the second voltage measurement 502 and the second distribution 802 via a second converter transformer 362 and a second converter switch 352. The second converter transformer 362 and the second converter switch 352 serve as second linking of the second converter 302.

Figure 2:
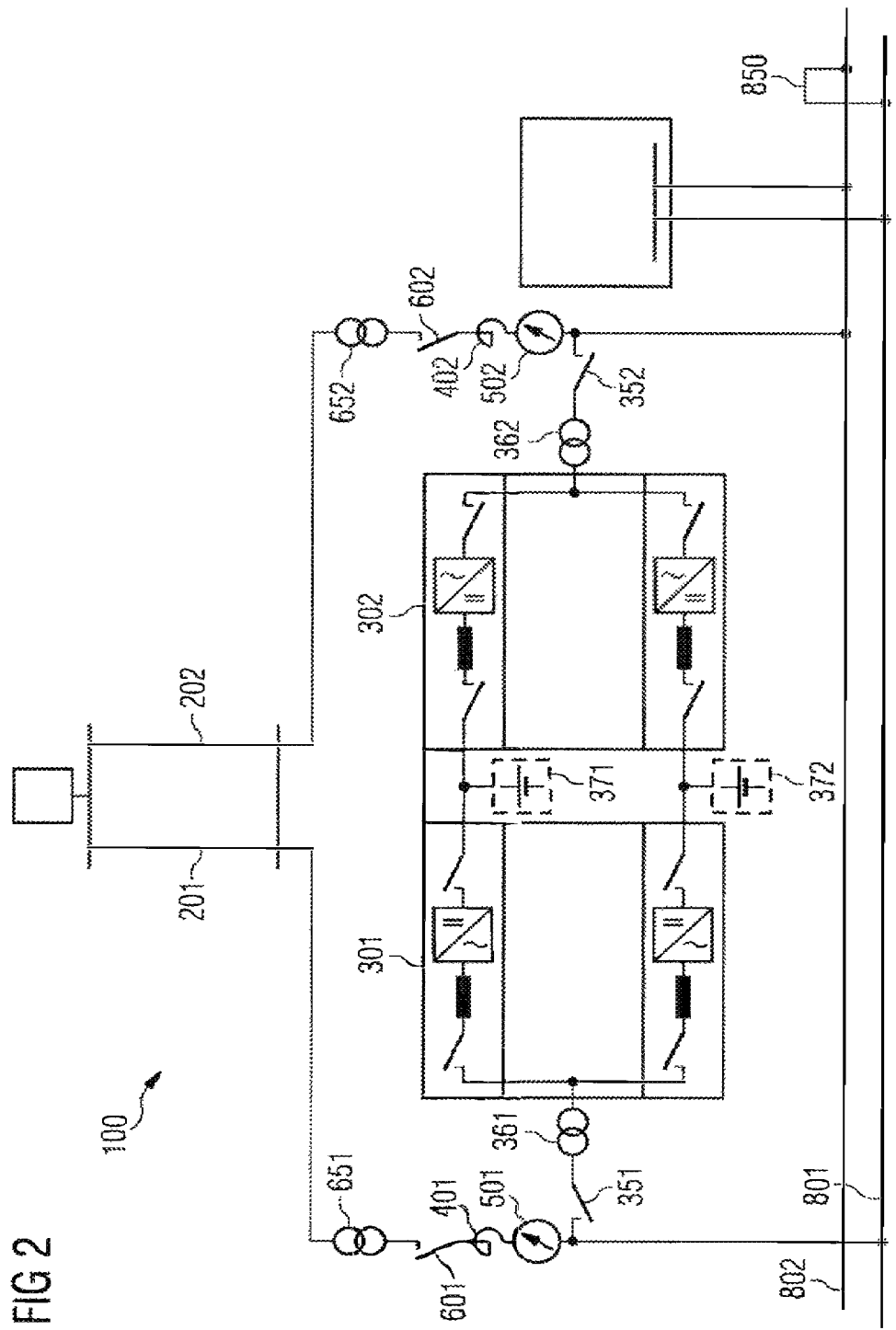
FIG. 2 shows a system comprising first and second converter systems and also first and second network infeeds and battery systems in the coupling of the link circuits of the first and second converter systems.

FIG. 2 illustrates the arrangement 100 according to an embodiment of the invention for compensating for voltage dips in a power supply network as illustrated in FIG. 1, wherein the coupling of the link circuits from the first converter system 301 and the second converter system 302 comprise battery systems 371, 372. These battery systems make it possible that all network faults and voltage dips in the first network infeed 201 or the second network infeed 202 can be compensated for, the number of cycles being dependent on the installed batteries 371, 372 or the capacity thereof.

Figure 3:
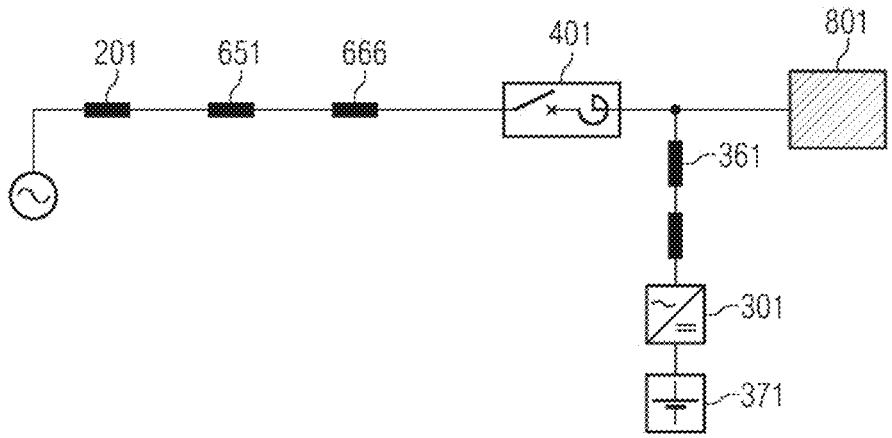
FIG. 3 shows a functional principle of the individual converter systems.

FIG. 3 shows the functional principle of the individual converter systems 301, 302. This is illustrated on the basis of the first converter system 301, in which proceeding from a first network infeed 201 via a first transformer 651 and corresponding line resistances 666, a first decoupling inductor 401 is arranged, wherein the first distribution 801 with its critical load and additionally the first converter transformer 361 with attached first converter 301 are arranged on the outgoing side of the first decoupling inductor 401.

The second path via the second network infeed 202 is analogous to the illustration in FIG. 3. The first converter system 301 and the second converter system 302 are coupled in their link circuits.

Figure 4:
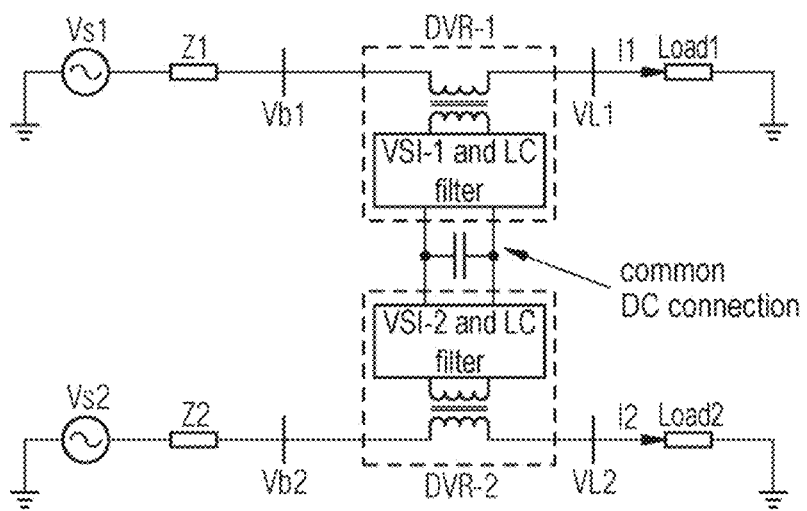
FIG. 4 shows an inter-line dynamic voltage restorer voltage stabilizer.
Figure 5:
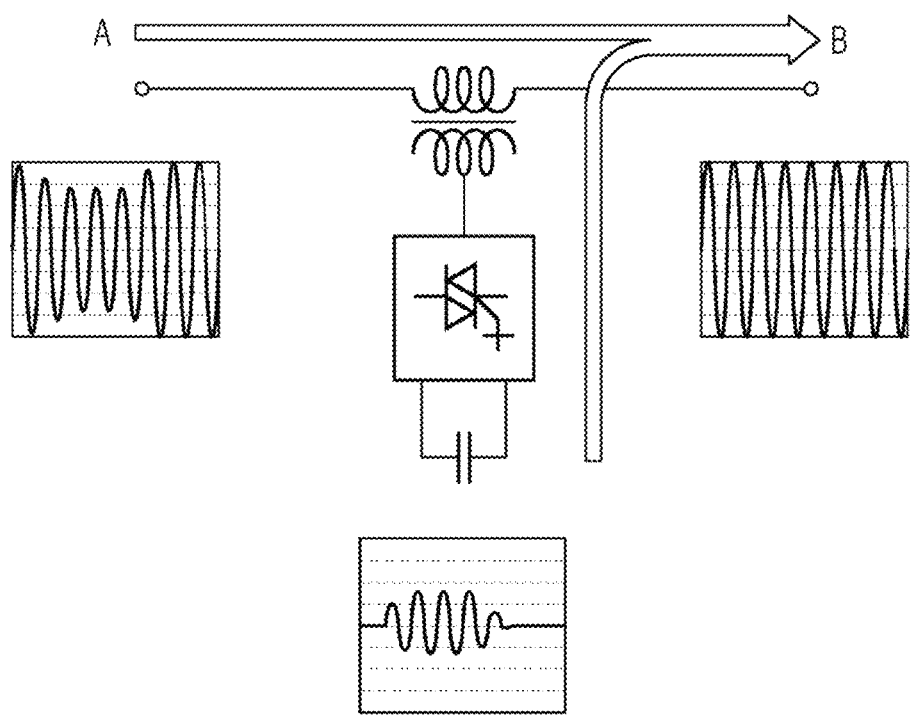
FIG. 5 shows a basic construction of a dynamic voltage restorer voltage stabilizer.

FIGS. 4 and 5 illustrate conventional solutions by way of a dynamic voltage restorer voltage stabilizer. FIG. 4 shows such a dynamic voltage restorer, wherein in the latter the two line paths are coupled via a capacitor. As a result, such a dynamic voltage restorer voltage stabilizer can compensate only for voltage dips up to approximately 30% residual voltage. In the event of an interruption in the network voltage, the dynamic voltage restorer voltage stabilizer cannot maintain the voltage.

FIG. 5 likewise illustrates a dynamic voltage restorer voltage stabilizer, wherein proceeding from a transfer from the network A to the load B, the energy stored in the capacitor serves for maintaining the voltage in the case of a voltage dip.

In accordance with FIGS. 1 and 2, the first distribution 801 can be electrically connected to the second distribution 802 via a back-to-back link 850.

In a first state the first switch 601 can be closed and the second switch 602 can be open. In a second state the first switch 601 can be open and the second switch 602 can be closed. Such a configuration with first state and second state ensures that one of the two network infeeds 201, 202 is electrically connected to one of the distributions 801, 802.

It is likewise conceivable that in a normal state the first switch 601 and the second switch 602 are in each case closed and in a failure state either the first switch 601 or the second switch 602 is opened. The network path in which the failure is present is disconnected as a result of the switch being opened, with the result that one of the two network infeeds 201, 202 is electrically connected to one of the distributions 801, 802.

Before the switchover of a switch 601, 602, the measured values of the first voltage measurement 501 and/or of the second voltage measurement 502 can be used for phase matching between first network infeed 201 and/or second network infeed 202 and the first distribution 801 and/or the second distribution 802, respectively.

The system according to an embodiment of the invention includes two DC/AC converter systems 301, 302, which are connected to a respective MV distribution 801, 802 together with a respective decoupling inductor 401, 402 and the link circuits of which are coupled. The functional principle of each individual converter system 301, 302 corresponds to that of the line-interactive UPS (energy store with network input coupling), which protects a sensitive load against disturbances in the network by virtue of the fact that it decouples faulty networks via a decoupling inductor 401, 402 and maintains the voltage at the critical load.

Two line-interactive UPS (energy store with network input coupling) systems are connected back-to-back to two infeed lines 801, 802. Proceeding from the assumption that a fault occurs only on one of the two network infeeds 201, 202, the power can be transferred from one feed system into the other feed system. If the fault occurs simultaneously in the superordinate infeed of the voltage, that is to say in the first network infeed 201 or the second network infeed 202, the system can support the voltage on both network infeeds in accordance with the configuration illustrated in FIG. 2. An additional energy store in the form of a battery system 371, 372 is necessary in this case. What all the embodiments have in common is that a decoupling inductor 401, 402 and a voltage measurement are provided on the network side for limiting the short-circuit current.

The invention claimed is:

1. An arrangement for compensating for voltage dips in a power supply network, the arrangement comprising:
at least one first converter system, configured to convert between alternating current and direct current; and
a second converter system, configured to convert between alternating current and direct current, wherein direct current link circuits of the at least one first converter system and the second converter system are coupled, wherein the at least one first converter system is connected to a first distribution of alternating current via a first converter switch and the second converter system is connected to a second distribution of alternating current via a second converter switch, and wherein:
the link circuits include two independent line paths through which the first converter system and second converter system are coupled, and each independent line path is directly connected to a battery system for compensating for the voltage dips;
the first converter switch is connected to the power supply network via a first decoupling inductor;
the second converter switch is connected to the power supply network via a second decoupling inductor;
the arrangement is configured to:
maintain the voltage at a critical load by decoupling the power supply network in a fault state from the critical load by:
opening the first decoupling inductor or the second decoupling inductor, and closing both the first converter switch and the second converter switch, or opening both the first decoupling inductor and the second decoupling inductor, and closing the first converter switch, the second converter switch, or a combination thereof;
compensate for a voltage dip at the critical load by maintaining the voltage of the critical load, utilizing the energy stored in the battery system; and
before the first decoupling indicator decouples the first distribution from the power supply network, phase match the first distribution.

2. The arrangement of claim 1, wherein the at least one first converter system is connected to the first distribution with the first decoupling inductor and a first voltage measurement and the second converter system is connected to the second distribution with the second decoupling inductor and a second voltage measurement.

3. The arrangement of claim 1, wherein the at least one first converter system and the second converter system are each embodied as a DC/AC converter system.

4. The arrangement of claim 1, wherein the first distribution and the second distribution are each embodied as a medium-voltage distribution.

5. A system, comprising:
the arrangement of claim 1;
a first network infeed; and
a second network infeed,
wherein the first network infeed is connected to the first distribution via a first transformer and a first switch, and
the second network infeed is connected to the second distribution via a second transformer and a second switch.

6. The system of claim 5, wherein in a first state of the arrangement, the first switch is closed and the second switch is open and in a second state of the arrangement, the first switch is open and the second switch is closed, resulting in one of the first network infeed and the second network infeed being electrically connected to one of the first distribution and the second distribution.

7. The system of claim 5, wherein in a normal state, the first switch and the second switch are closed and in a failure state, either the first switch is opened or the second switch is opened, resulting in one of the first network infeed and the second network infeed being electrically connected to one of the first distribution and the second distribution.

8. The system of claim 5, wherein the first distribution is electrically connected to the second distribution via a back-to-back link.

9. The arrangement of claim 2, wherein, before a switchover of a switch, measured values of at least one of the first voltage measurement and the second voltage measurement are used for phase matching.

10. The system of claim 5, wherein the at least one first converter system is connected to the first distribution with the first decoupling inductor and a first voltage measurement and the second converter system is connected to the second distribution with the second decoupling inductor and a second voltage measurement.

11. The system of claim 5, wherein the at least one first converter system and the second converter system are each embodied as a DC/AC converter system.

12. The system of claim 5, wherein the first distribution and the second distribution are each embodied as a medium-voltage distribution.

13. The system of claim 6, wherein the first distribution is electrically connected to the second distribution via a back-to-back link.

14. A system, comprising:
an arrangement;
a first network infeed; and
a second network infeed,
the first network infeed being connected to a first distribution via a first transformer and a first switch, and the second network infeed being connected to a second distribution via a second transformer and a second switch,
wherein:
the arrangement comprises:
at least one first converter system, configured to convert between alternating current and direct current; and
a second converter system, configured to convert between alternating current and direct current, direct current link circuits of the at least one first converter system and the second converter system being coupled, wherein the at least one first converter system is connected to a first distribution of alternating current via a first converter switch and the second converter system is connected to a second distribution of alternating current via a second converter switch, and
wherein the link circuits include two independent line paths, and each independent line path is directly connected to a battery system for compensating for voltage dips;
the first converter switch is configured to connect to a power supply network via a first decoupling inductor;
the second converter switch is configured to connect to the power supply network via a second decoupling inductor;
the arrangement is configured to:
maintain the voltage at a critical load by decoupling the power supply network in a fault state from the critical load by:
opening the first decoupling inductor or the second decoupling inductor, and closing both the first converter switch and the second converter switch, or
opening both the first decoupling inductor and the second decoupling inductor, and closing the first converter switch, the second converter switch, or a combination thereof;
compensate for a voltage dip at the critical load by maintaining the voltage of the critical load, utilizing the energy stored in the battery system; and
before the first decoupling indicator decouples the first distribution from the power supply network, phase match the first distribution.

15. The system of claim 14, wherein the first distribution is electrically connected to the second distribution via a back-to-back link.

16. The system of claim 14, wherein, before a switchover of a switch, measured values of at least one of a first voltage measurement and a second voltage measurement are used for phase matching.

* * * * *